United States Patent
An et al.

(10) Patent No.: US 7,872,947 B2
(45) Date of Patent: Jan. 18, 2011

(54) SYSTEM AND METHOD FOR UNDERWATER WIRELESS COMMUNICATION

(75) Inventors: Sun-Shin An, Seoul (KR); Heung-Woo Nam, Seoul (KR); Jun-Heung Ku, Seoul (KR)

(73) Assignee: Gangneung-Wonju National University Industry Academy Cooperation Group (KR)

( * ) Notice: Subject to any disclaimer, the term of this patent is extended or adjusted under 35 U.S.C. 154(b) by 257 days.

(21) Appl. No.: 12/118,058

(22) Filed: May 9, 2008

(65) Prior Publication Data

US 2008/0279047 A1    Nov. 13, 2008

(30) Foreign Application Priority Data

May 9, 2007   (KR) .................. 10-2007-0045154

(51) Int. Cl.
*H04B 11/00* (2006.01)
(52) U.S. Cl. ...................................... 367/134
(58) Field of Classification Search ............. 367/134, 367/128
See application file for complete search history.

(56) References Cited

U.S. PATENT DOCUMENTS

| | | | |
|---|---|---|---|
| 5,579,285 A * | 11/1996 | Hubert | 367/133 |
| 7,272,074 B2 * | 9/2007 | Basilico | 367/128 |
| 7,483,337 B2 * | 1/2009 | Basilico | 367/128 |
| 7,512,036 B2 * | 3/2009 | Crowell | 367/127 |
| 2006/0215494 A1 * | 9/2006 | Thomas | 367/128 |
| 2007/0014189 A1 * | 1/2007 | Basilico | 367/128 |
| 2008/0008045 A1 * | 1/2008 | Basilico | 367/128 |
| 2008/0279047 A1 * | 11/2008 | An et al. | 367/134 |
| 2009/0141591 A1 * | 6/2009 | Basilico | 367/128 |

FOREIGN PATENT DOCUMENTS

| | | |
|---|---|---|
| JP | 07-110380 | 4/1995 |
| KR | 2005-63500 | 6/2005 |

* cited by examiner

*Primary Examiner*—Dan Pihulic
(74) *Attorney, Agent, or Firm*—Brinks Hofer Gilson & Lione (57) ABSTRACT

An underwater wireless communication system and method includes a sensor node for transforming measured underwater data into ultrasound signals, and transmitting the transformed ultrasound signals and receiving other ultrasound signals.

10 Claims, 6 Drawing Sheets

SYSTEM AND METHOD FOR UNDERWATER WIRELESS COMMUNICATION

PRIORITY CLAIM

This application claims under 35 U.S.C. §119 the benefit of the filing date of May 9, 2007 of Korean Patent Application No. 10-2007-0045154, the disclosure of which is incorporated herein by reference in its entirety.

BACKGROUND

1. Technical Field

The present invention relates to data communication, and more particularly to an underwater data communication system and method for transmitting data produced by monitoring underwater environments.

2. Related Art

In an underwater environment, RF-based communications may not be appropriate because of a very low transmission range, requiring large antennae and high transmission power. Consequently, underwater communication relies on an acoustic or ultrasonic wave rather than a radio wave. Unlike a mobile communication in the air, factors such as slow speed of a sound wave (1.5 Km per hour), a narrow usable bandwidth, and reflection by the sea floor or sea surface may interfere with performance of underwater data communication. The existing submarines or remotely operated vehicles ("ROVs") may not be practical solutions for measuring and monitoring underwater environments because such systems are not cost-effective. In addition, no underwater communication systems based on low-power and low-cost is currently available. Accordingly, there is a need of a system and method for underwater wireless communication that obviates drawbacks of the related art.

SUMMARY

By way of example, in one embodiment, an underwater wireless data communication system includes a memory, a sensor array, a controller and a data transmitter. The memory stores location data and the sensor array includes a plurality of sensors for measuring an underwater environment to generate and output a measured signal. The controller is operable to receive the measurement data, retrieve the location data and output the measurement data and the location data as a data signal. The data transmitter is operable to amplify the data signal up to a predetermined voltage level and transform the amplified data signal into an ultrasound signal to be emitted into water. The location data may specify the location of the sensor array.

In another embodiment, an underwater wireless data communication method of transforming measurement data into an ultrasound signal, and transmitting and receiving the ultrasound signal. The method includes generating the measurement data by monitoring an underwater environment by using the sensors, reading a location data indicative of the location of the data communication system, and outputting the location data and the measurement data as a data signal, generating a frequency signal having a predetermined amplitude at a predetermined interval and adding the data signal to the frequency signal as a modulated data signal, amplifying the modulated data signal up to a predetermined voltage level, and transforming the amplified data signal into an ultrasound signal to be transmitted.

In another embodiment, a method of receiving data in a data communication system having a plurality of sensor, including receiving an ultrasound signal transmitted through water and amplifying the ultrasound signal up to a predetermined voltage level, removing a noise from the amplified ultrasound signal based on a first reference voltage, obtaining an original data signal by detecting a predetermined envelop from the frequency signal without the noise, and converting the original data signal into a digital data signal based on a second reference voltage.

The accompanying drawings and the detailed description are just examples of the present invention for describing the present invention properly, it is not intended to limit the meaning or the scope of the present invention as claim. Thus, those who skilled in the art will understand that various changes and equivalent other embodiments may arise from accompanying drawings and the detailed description.

DETAILED DESCRIPTION OF PREFERRED EMBODIMENTS

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Figure 1:
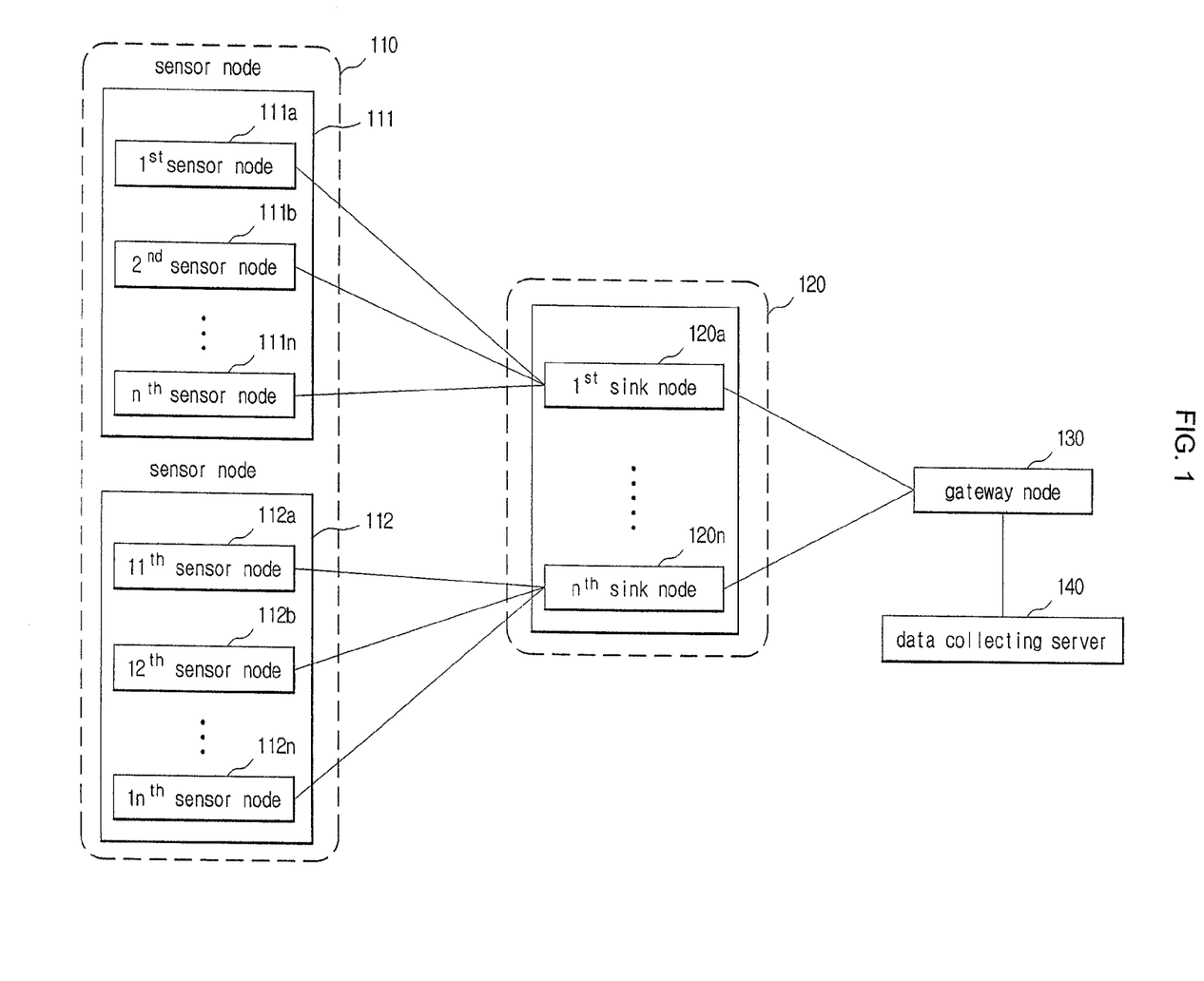
FIG. 1 is a block diagram illustrating one embodiment of an underwater wireless communication system.
Figure 2:
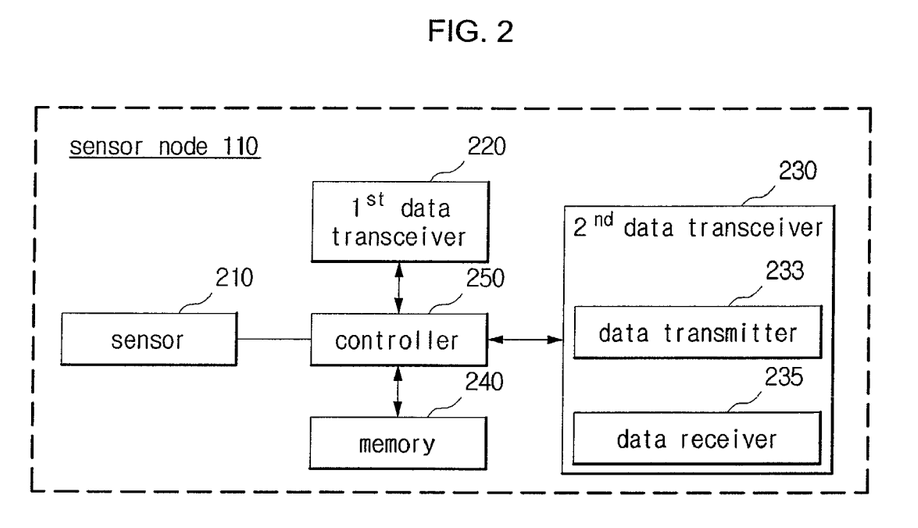
FIG. 2 is a block diagram illustrating a sensor node of FIG. 1.
Figure 3:
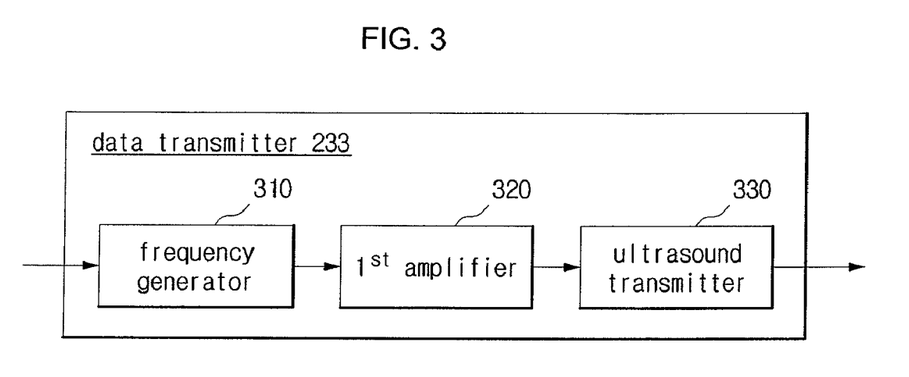
FIG. 3 is a block diagram illustrating a data transmitter of FIG. 2.
Figure 4:
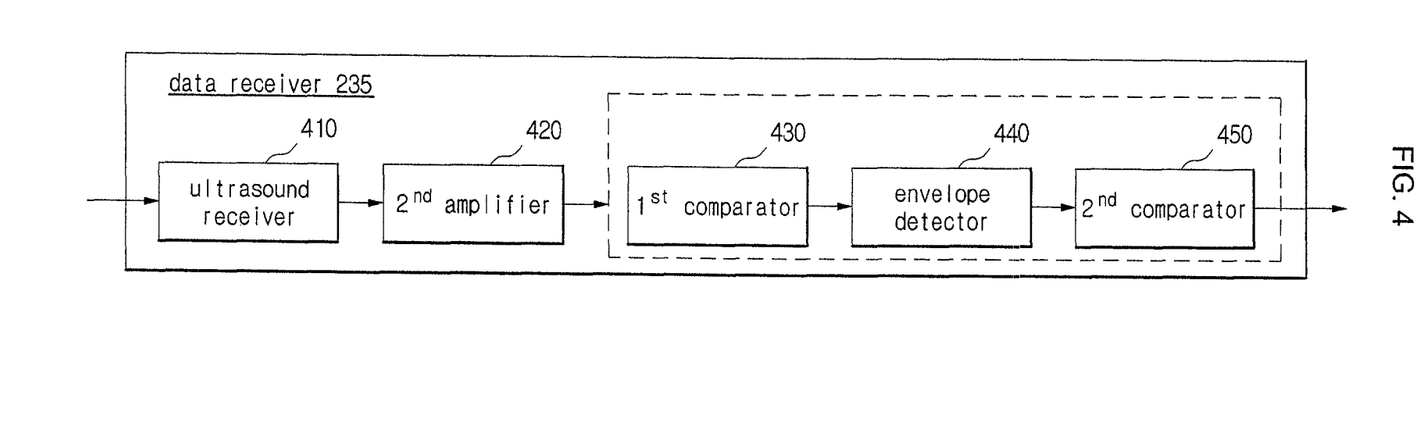
FIG. 4 is a block diagram illustrating a data receiver of FIG. 2.

FIG. 1 is a block diagram of an underwater wireless communication system; FIG. 2 is a block diagram of a sensor node; FIG. 3 is a block diagram of a data transmitter; and FIG. 4 is a block diagram of a data receiver. A sensor node 110 operates a data communication system for measuring an underwater environment and transmitting/receiving measurement data through water, and may be referred to as the sensor node 110 or data communication system according to its context.

Referring to FIG. 1, the underwater wireless communication system 100 includes the sensor node 110, a sink node 120, a gateway node 130, and a data collecting server 140. The sensor node 110 includes a plurality of sensors for data collection on the seafloor, and each sensor measures underwater environments such as seafloor temperature, water temperature, an amount of dissolved oxygen, a seismic wave, etc. Each sensor measures certain physical quantities under water and generates measurement data. The sensor node 110 transforms the measurement data into an ultrasound signal and transmits the ultrasound signal through water. The sensor node 110 may transmit the measurement data with location data indicative of where the sensor node 110 is located. The location data of the sensor node 110 can be recorded when the sensor node 110 is positioned at a certain location. Thus, the sensor node 110 transmits the measurement data and the location data to the data collecting server 140 for monitoring the underwater environment. In addition, the sensor node 110 receives an ultrasound signal emitted from another sensor node, obtain the measurement data and the location data and then transmit them to the sink node 120. The sensor node 110, on one hand, transforms the measurement data and the location data into the ultrasound signal to be emitted through water, and on the other hand, obtains the measurement data and the location data by receiving the ultrasound signal emitted from another sensor node and transmit the received measurement data and the location data to the sink node 120.

With reference to FIG. 2, each structure of the sensor node 110 will be described in detail. As shown in FIG. 2, the sensor node 110 includes a sensor array 210, a first data transceiver 220, a second data transceiver 230, a memory 240, and a controller 250. As described above, the sensor node 110 operates as a data transmission system with a plurality of sensor for measuring underwater environments to produce the measurement data and transforming the measurement data into the ultrasound signal for transmission to the data collecting server 140 on the ground.

The sensor array 210 includes the plurality of sensors that generates the measurement data and sends it to the controller 250. The sensor array 210 further includes an analog-to-digital (AD) converter for converting the measurement data in analog form into digital data. The measurement data output from the sensor array 210 is the digital data after converted by the AD converter. The plurality of sensors in the sensor array 210 includes various types of sensors. By way of example, the sensor array 210 includes a temperature sensor for measuring water temperature, a three-dimensional acceleration sensor for measuring a seismic wave, a magnetic sensor, a pressure sensor, and a dissolved oxygen sensor for measuring the amount of oxygen dissolved in water.

The first data transceiver 220 transmits data by using a radio frequency (RF) signal to the ground or receives a control signal from the ground. Alternatively, or additionally, the gateway node 130 may include a data transceiver. The data transceiver included in the gateway node 130 may perform the substantially same function (i.e., transmitting data to the ground) as the first data transceiver 220, which enables communication with the data collecting server 140 via a network.

The second data transceiver 230 includes a data transmitter 233 and a data receiver 235. The data transmitter 233 transforms the measurement data and the location data into the ultrasound signal, and the data receiver 235 receives the emitted ultrasound signal to obtain the measurement data and location data from the ultrasound signal. Alternatively, the second data transceiver 230 may be integrated into the sink node 120 or the gateway node 130.

FIG. 3 is a block diagram illustrating structure of the data transmitter 233 of FIG. 2. In FIG. 3, the data transmitter 233 includes a frequency generator 310, a first amplifier 320, and an ultrasound transmitter 330. The frequency generator 310 generates a predetermined frequency, adds the measurement data and the location data from the sensor array 210 to the generated frequency, and outputs the added frequency to the first amplifier 320. For example, the frequency generator 310 generates the predetermined frequency of 40 KHz at predetermined intervals and outputs the frequency of 40 KHz to the first amplifier 320 after adding to the measurement data and the location data from the sensor array 110 and modulating the amplitude of the frequency. The frequency generated by the frequency generator 310 may be applicable to the ultrasound transmitter 330, which will be described later. The frequency to which the measurement data and the location data from the sensor array 210 are added is referred to as a modulated data signal.

The first amplifier 320 amplifies the modulated data signal from the frequency generator 310 based on a predetermine voltage level and outputs the modulated data signal to the ultrasound transmitter 330. The signal amplified by the first amplifier 320 and outputted to the ultrasound transmitter 330 is referred as an amplified data signal. For example, the first amplifier 320 operates to amplify the modulated data signal in a voltage level range of −6V to +6V.

The ultrasound transmitter 330 transforms the amplified data signal from the first amplifier 320 into the ultrasound signal for emission through water. In one embodiment, the ultrasound transmitter 330 may be implemented, for example, to operate with a frequency of 40 KHz. Thus, the ultrasound transmitter 330 may operate with the frequency generated by the frequency generator 310 continuously, or at certain intervals. Alternatively, the ultrasound transmitter 330 may operate according to the amplified data signal from the first amplifier 320.

The operation of the ultrasound transmitter 330 according to the amplified data signal from the first amplifier 320 will be described in detail. The ultrasound transmitter 340 operates with the amplified data signal from the first amplifier 330, and emits the amplified data signal into water after transforming into the ultrasound signal. As described above in conjunction with FIG. 2, the data transmitter 233 under the control of the controller 250 transmits the measurement data and the stored location data in advance after transformation into the ultrasound signal. Referring back to FIG. 2, the data receiver 235 receives an ultrasound signal emitted by another sensor node, obtains the measurement data and location data from the ultrasound signal, and outputs them to the controller 250.

FIG. 4 is a block diagram illustrating structure of the data receiver 235. Referring to FIG. 4, the data receiver 235 includes an ultrasound receiver 410, a second amplifier 420, a first comparator 430, an envelop detector 440, and a second amplifier 450. The ultrasound receiver 410 receives the ultrasound signal emitted by another sensor node and outputs it to the second amplifier 420. Each of the sensor nodes (e.g., the first sensor node 110a, the second sensor node 110b, . . . , the nth sensor node 110n) transmits data by using ultrasound. Thus, the ultrasound receiver 410 receives the ultrasound signal water and outputs it to the second amplifier 420.

The second amplifier 420 amplifies the ultrasound signal being received by the ultrasound receiver 410 up to the predetermined voltage level and outputs it to the first comparator 430. For example, the second amplifier 420 amplifies the ultrasound signal up to a voltage level corresponding to 500 mV and then outputs it to the first comparator 430. Due to the underwater characteristics, the ultrasound signal may have its amplitude changed by scattering and attenuation after being emitted into the water.

The first comparator 430 removes a noise of the ultrasound signal from the second amplifier 420 based on a predetermined reference voltage and outputs it to the envelop detector 440. The reference voltage is, for example, 200 mV. Accordingly, the first comparator 430 may remove noise by comparing the predetermined reference voltage to the amplified ultrasound signal from the second amplifier 420. Noise may be removed without a low pass filter or a high pass filter. The envelop detector 440 obtains an original signal (for the convenience of description, referred as an "original data signal") by using the noise-free ultrasound signal from the first comparator 430 and a predetermined envelop signal, and outputs it to the second comparator 450. For example, the envelop detector 440 passes the signal of between 0V and 1.12V to the second comparator 450.

As described above, a few sensor nodes output the ultrasound signal as an output signal which contains the measurement data generated by those sensor nodes and the location data of the sensor nodes. Data obtained by the envelop detector 440 correspond to the measurement data generated by the sensor node that measures the underwater environment and the location data of the sensor node that generates the measurement data.

The second comparator 450 converts the original data signal from the envelop detector 440 into a digital signal based on the predetermined reference voltage, and outputs it to the controller 50. For example, the second comparator 450 may convert the original data signal into a digital signal based on the reference voltage of 600 mV. The first comparator 430, the envelop detector 440, and the second comparator 450 may be integrated on a single integrated chip.

Referring to FIG. 2 again, the memory 240 under control of the controller 250 stores the measurement data from the sensor array 210, the data being obtained from a certain sensor node, and the location data of the sensor node 110. The memory 240 also stores a program including an algorithm for operating the sensor node 110. The controller 250 performs a function of controlling components of the sensor node 110 (e.g., sensor array 210, the first data transceiver 220, the second data transceiver 230, the memory 240, etc.).

Although not shown in FIG. 2, the sensor node 110 further includes a power connector through which power used for operation of the sensor node 110 is externally supplied. The sensor node 110 includes a connector for testing the sensor node using a user terminal (for example, a computer, etc.) such as UART, JATG, ISP, etc.

Referring to FIG. 1 again, the sink node 120 receives an output signal from a plurality of sensor node (the first sensor node 111a, the second sensor node 111b, . . . , the nth sensor node 111n), and transmits it to the gateway node 130. As described above, limitations such as slow speed of a sound wave (1.5 Km per second) under water, a narrow usable bandwidth, and reflection from the sea floor or sea surface, may affect the data transmission range of the sensor node 110. A relay or a repeater such as the sink node 120 may be installed to relay the measurement data from the sensor node 110 to the gateway node 130. The sink node 120 may include a component having the substantially same function as the second data transceiver of the sensor node 110.

The gateway node 130 receives an output signal from a plurality of sink node (i.e., the first sink node 120a, the second sink node 120b, . . . , the nth sink node 120n), and transmits it to the data collecting server 140 via a network using an RF signal (e.g., a mobile communication network, a satellite network, etc).

In one embodiment, the gateway node 130 includes a plurality of transceiver for transmitting data. One of the transceivers performs the same function as the first data transceiver 220 of the sensor node 110, and the other of the transceivers performs the same function as the second data transceiver 230 of the sensor node 110. Thus, the operations of the first data transceiver 220 and the second transceiver 230 may be applicable to the first and the second transceivers. One transceiver may transmit data from the sink node 120 to the data collecting server 140 via a network using an RF signal. Also, the other transceiver can receive control signal for controlling the sink node 120 and the sensor node 110 from the data collecting server 140 and control the sink node 120 and the sensor node 110.

The data collecting server 140 receives and stores the output signal being sent from the sensor node 110 via a plurality of gateway node 130. In one embodiment, the data collecting server 140 may distinguish the measurement data and the location data, and store them separately. The data collecting server 140 may transmit the collected data to a user terminal that is coupled to a wired/wireless network and requests the data.

Figure 5:
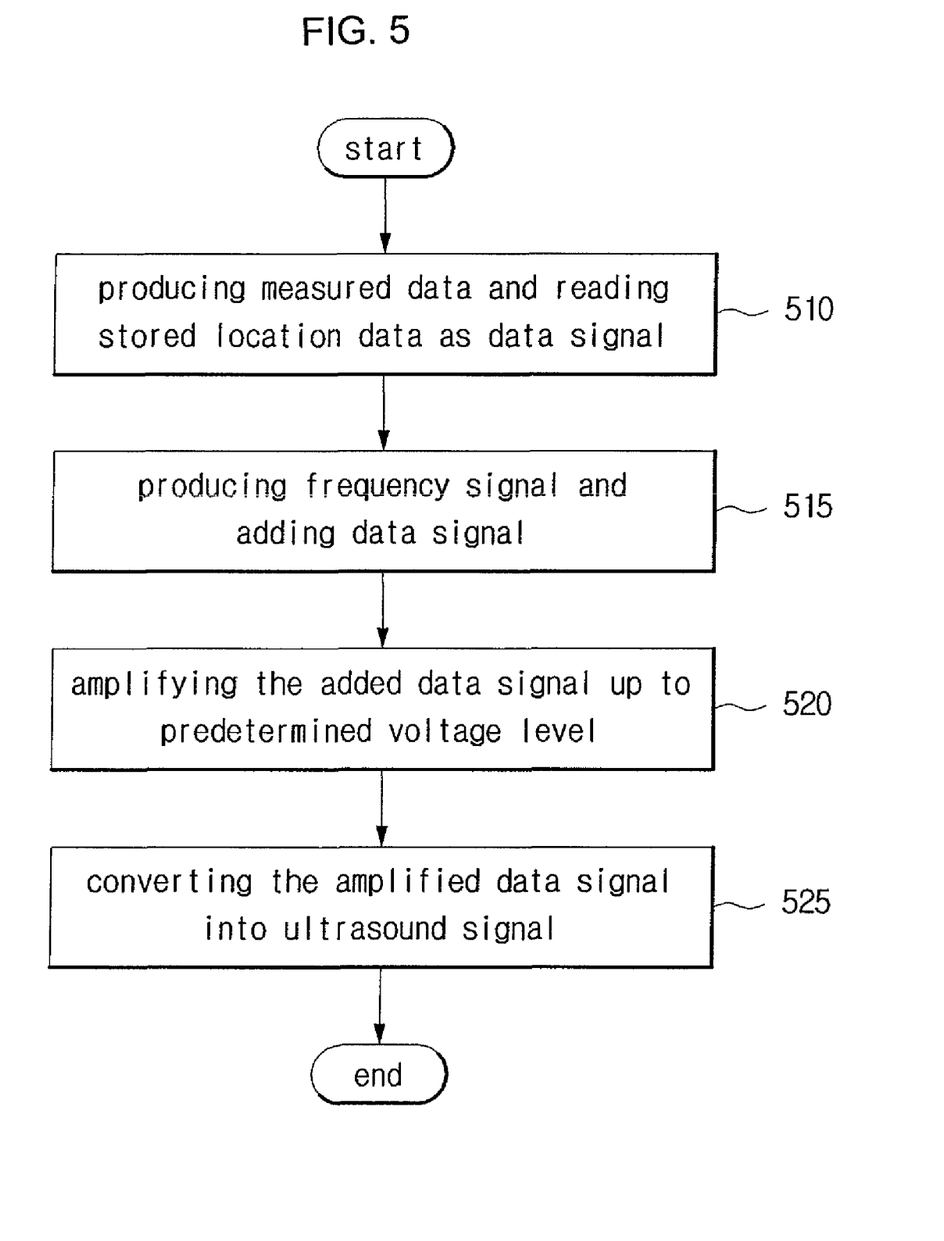
FIGS. 5-6 are flowcharts illustrating one embodiment of an underwater wireless communication method.

FIG. 5 is a flowchart operation of the sensor node 110 that transmits data. Referring to FIG. 5, a method of transmitting the measurement data in the form of ultrasound is described. In this embodiment, the sensor node 110 generates the measurement data and transmits it to another sensor node. In another embodiment, the sensor node 110 may receive the measurement data from another sensor node.

In block 510, the sensor array 210 measures the underwater environment and generates the measurement data to be outputted to the controller 250. The controller 250 generates an output signal based on the location data specifying where the sensor node 110 is located and the measurement data from the sensor array 210. The controller 250 outputs the measurement data and the location data of the sensor node 110 stored in the memory as a data signal to the frequency generator 310. For example, the sensor array 210 can include a temperature sensor for measuring the water temperature, an acceleration sensor for measuring the seismic wave, a magnetic sensor, a pressure sensor, etc. Additionally, the sensor array 210 may include various other sensors. Thus, the sensor array 210 generates the measurement data after measuring the underwater environment by using the sensors and outputs it to the frequency generator 310 under the control of the controller 250.

In block 515, the frequency generator 310 generates a certain frequency with predetermined amplitude at certain intervals. The frequency generator 310 adds the measured signal from the controller 250 and the location data to the frequency and outputs it to the first amplifier 320. As such, by adding the measurement data and the location data, both in the form of digital signal, to the frequency signal from the frequency generator 310, the digital signal may be converted into an analog signal.

In block 520, the first amplifier 320 amplifies the modulated data signal from the frequency generator 310 up to the predetermined voltage level and outputs it to the ultrasound transmitter 330. As described above, the first amplifier 320 amplify the modulated data signal in the voltage level of between −6V and +6V. In block 525, the ultrasound transmitter 330 operates with the amplified data signal from the first amplifier 320 to transform the amplified data signal into an ultrasound signal and emits it into the water.

The ultrasound transmitter 330 may be implemented, for example, to operate with a frequency (40 KHz) generated by the frequency generator 310. Thus, the amplified data signal is a sum of the frequency signal from the frequency generator 310 and the measurement data and the location data, and the ultrasound transmitter may operate with the amplified data signal. Alternatively, or additionally, the frequency generator 310 may output a frequency signal to the frequency transmitter 330 at certain intervals, and the frequency transmitter 330 can operate with the frequency signal from the frequency generator 310.

Figure 6:
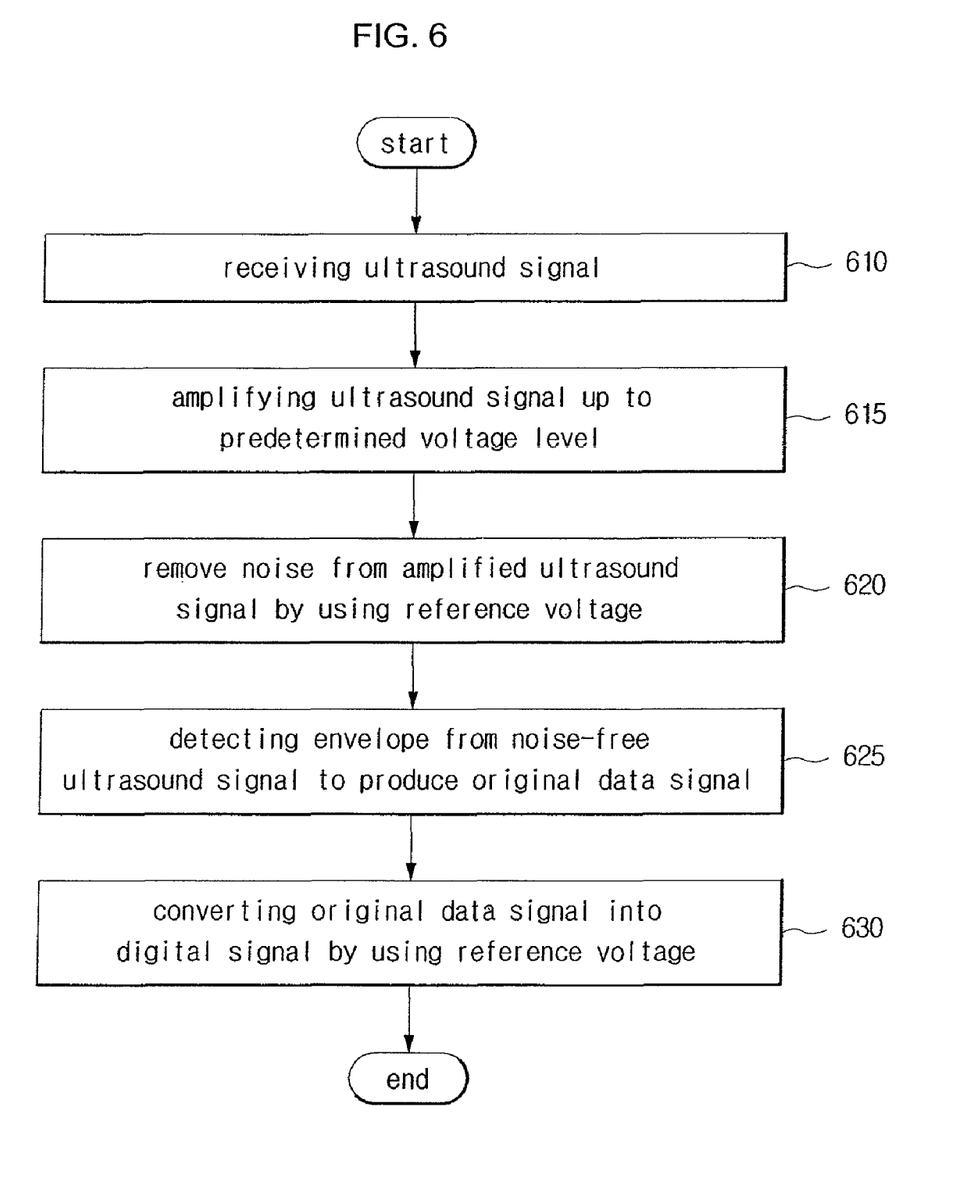

FIG. 6 is a flowchart showing receiving operation of the sensor node 110. Referring to FIG. 6, the method of receiving the ultrasound signal having a measurement data from another sensor node and obtaining the measurement data is described in detail. As described above, the sink node 120 receives the ultrasound signal emitted from a sensor node and obtains the measurement data in the same manner that the sensor node 110 receives the ultrasound signal from another sensor node. The process of obtaining an output signal in the sensor node 110 is described in detail. In block 610, the ultrasound receiver 410 receives the ultrasound signal emitted from another sensor node and outputs it to the second amplifier 420. The ultrasound signal includes the measurement data and location data of another sensor node.

In block 615, the second amplifier 420 amplifies the ultrasound signal from the ultrasound receiver 410 up to the predetermined voltage level and outputs it to the first comparator 430. For example, the second amplifier 420 can amplify the ultrasound signal up to a voltage level corresponding to 500 mV.

In block 620, the first comparator 430 removes noise of the amplified ultrasound signal from the second amplifier 420 based on the predetermined reference voltage (e.g., 200 mV) and outputs it to the envelop detector 440. As described above, the first comparator 430 removes noise from the second amplifier 420 based on the predetermined reference voltage such that the noise may be removed without an additional filter (e.g., low pass filter, high pass filter, etc.). In block 625, the envelop detector 440 detects the predetermined envelop from the ultrasound signal without noise to obtain an original data signal and outputs it to the second comparator 450. For example, the envelop detector 440 obtains a signal in the range of between 0V and 1.12V from the ultrasound signal without noise and outputs it as the original data signal to the second comparator 450.

In block 630, the second comparator 450 converts the original data signal from the envelop detector 440 into a digital signal based on the predetermined reference voltage (e.g., 600 mv) and outputs it to the controller 250. As such, the controller 250 transforms the output signal into an ultrasound signal and transmits it to the sink node by using the data transmitter 233. Thus, the underwater environment may be effectively monitored.

The underwater wireless communication system and method described above transmits and receives measurement data by transforming measured underwater data into ultrasound signals. The system and method may operate with a low power via a low-power based acoustic modem, which operates with a 3.3V power supply, and extend the lifetime of an underwater communication system. The system and method may replace high-cost equipment such as a submarine or an ROV and perform a cost-effective task.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the ideas of the appended claims.

We claim:

1. An underwater wireless data communication system, comprising:

a memory that stores a first location data;

a sensor array for measuring an underwater environment with a plurality of sensors, a sensor generating and outputting a first measurement data;

a controller operable to receive the first measurement data, retrieve the first location data, and output the first measurement data and the first location data as a data signal;

a data transmitter operable to amplify the data signal up to a predetermined voltage level and transform the amplified data signal into a first ultrasound signal for emission into water; and a data receiver operable to receive a second ultrasound signal and obtain a second measurement data and a second location data from the second ultrasound signal, wherein the data receiver comprises:

an ultrasound receiver operable to receive the second ultrasound signal having the second measurement data and the second location data;

a second amplifier operable to amplify the second ultrasound signal;

a first comparator operable to receive the amplified second ultrasound signal and remove a noise from the amplified second ultrasound signal based on a first reference voltage;

an envelop detector operable to receive the amplified second ultrasound signal without the noise and detect a predetermined envelop to obtain an original data signal; and a second comparator operable to convert the original data signal into a digital signal based on a second reference voltage, wherein the first comparator, the envelop detector, and the second comparator are implemented on a single chip.

2. The system of claim 1, wherein the location data specifies the location of the sensor array.

3. The system of claim 1, wherein the data transmitter comprises:

a frequency generator operable to generate a selected frequency signal and add the data signal to the frequency signal;

a first amplifier operable to amplify the added data signal; and an ultrasound transmitter operating with the amplified data signal from the first amplifier and operable to transform the amplified data signal into the ultrasound signal.

4. The system of claim 3, wherein a frequency of the selected frequency signal is 40 KHz, and a voltage level of the selected frequency signal ranges between −6V and +6V.

5. The system of claim 1, wherein the plurality of sensors comprises a temperature sensor for measuring water temperature, an acceleration sensor for measuring a seismic wave, a magnetic sensor, a pressure sensor, or a combination thereof.

6. The system in claim 1, wherein the first reference voltage is 200 mV and the second reference voltage is 600 mV.

7. The system in claim 1, wherein the original data signal ranges 0V to 1.12V.

8. A method of transmitting data with an underwater wireless data communication system having a plurality of sensors, the method comprising:

generating measurement data by measuring an underwater environment with the plurality of sensors;

retrieving a location data specifying the location of the underwater wireless data communication system and outputting the location data and the measurement data as a data signal;

generating a frequency signal at a predetermined interval and adding the data signal to the frequency signal to form a modulated data signal;

amplifying the modulated data signal up to a predetermined voltage level; and transforming the amplified data signal into an ultrasound signal for transmission, wherein a frequency of the frequency signal is 40 KHz and a voltage level of the frequency signal ranges −6V and +6V.

9. A method of receiving data in an underwater wireless data communication system having a plurality of sensors, the method comprising:
   receiving an ultrasound signal transmitted through water and amplifying the ultrasound signal up to a predetermined voltage level;
   removing a noise from the amplified ultrasound signal based on a first reference voltage;
   obtaining an original data signal by detecting a predetermined envelop from the ultrasound signal without noise; and
   converting the original data signal into a digital data based on a second reference voltage.

10. The method in claim 9, wherein the first reference voltage is 200 mV and the second reference voltage is 600 mV and the original data signal ranges between 0V and 1.12V.

* * * * *